United States Patent [19]
Chen et al.

[11] Patent Number: 6,016,290
[45] Date of Patent: Jan. 18, 2000

[54] READ/WRITE HEAD WITH SHIFTED WAVEGUIDE

[75] Inventors: Hong Chen, San Jose; Ross W Stovall, Fremont; Carl Carlson, Pleasanton, all of Calif.

[73] Assignee: Read-Rite Corporation, Milpitas, Calif.

[21] Appl. No.: 09/248,766

[22] Filed: Feb. 12, 1999

[51] Int. Cl.$^7$ .............................. G11B 11/00; G11B 5/39
[52] U.S. Cl. .............................................. 369/13; 360/113
[58] Field of Search ................................... 369/13, 44.15, 369/44.16, 44.17, 44.18; 360/113, 110, 119, 120, 122, 125, 126, 114, 55, 59

[56] References Cited

U.S. PATENT DOCUMENTS

| | | |
|---|---|---|
| 5,199,090 | 3/1993 | Bell . |
| 5,295,122 | 3/1994 | Murakami et al. . |
| 5,353,268 | 10/1994 | Hintz . |
| 5,446,613 | 8/1995 | Rottmayer . |
| 5,576,914 | 11/1996 | Rottmayer et al. . |
| 5,726,964 | 3/1998 | Van Kesteren et al. . |

OTHER PUBLICATIONS

Ikeda et al. "MR Sensor for Magnetic Encoder", IEEE Translation Journal on Magnetics in Japan, vol. 7, No. 9, Sep. 1992, pp. 705–713.

Chien et al., Giant Negative Magnetoresistive in Granular Ferromagnetic Systems:, Journal of Applied Physics, 73 (10), May 1993, pp. 5309–5314.

Yamamoto et al., "Magnetoresistive of Multilayers", IEEE Transactional Journal of Magnetics in Japan, vol. 7, No. 9, Sep. 1992, pp. 674–684.

"The Physical Principles of Magneto–optical Recording", Masud Mansuripur, pp. 17–20 (1995).

*Primary Examiner*—Ali Neyzari
*Attorney, Agent, or Firm*—Robert King; Samuel A. Kassatly

[57] ABSTRACT

A read/write head for use in data storage drives includes a thermally assisted inductive write section and a magnetic read section to write data onto, and retrieve data from a storage medium. The write section includes a waveguide formed of a core and a surrounding cladding, and positioned between a first write pole and a second write pole, to conduct a laser beam for heating the medium. The second write pole and the optical waveguide core are offset relative to each other at the pole tip, such that they define an overlap region that determines a written track width. The offsetting facilitates manufacturing process since the optical waveguide core and the second write pole can be made wide enough while still defining tracks with a limited width.

27 Claims, 8 Drawing Sheets

READ/WRITE HEAD WITH SHIFTED WAVEGUIDE

CROSS-REFERENCE TO RELATED APPLICATIONS

This application relates to copending U.S. patent application Ser. No. 09/005,914, filed on Jan. 12, 1998, titled "Read/Write Head and Method for Magnetic Reading and Thermally Assisted Writing on a Data Storage Medium", assigned to the same assignee as the present application, and incorporated herein by reference in its entirety.

BACKGROUND OF THE INVENTION

1. Field of the Invention

The present invention relates in general to data storage systems such as disk drives. This invention relates in particular to a read/write head for use in magnetic and magneto-optical data storage systems to enable writing of data to a magnetic data storage medium with the assistance of laser heating. More specifically, the head allows magnetic reading of data from the storage medium, and thermally assisted magnetic writing of data on the storage medium, thus significantly improving the thermal stability of the recorded data.

2. Description of Related Art

A conventional magnetic storage system typically includes a magnetic head that has a slider element and a magnetic read/write element, and is coupled to a rotary actuator magnet and a voice coil assembly by a suspension and an actuator arm positioned over a surface of a spinning magnetic disk. In operation, a lift force is generated by the aerodynamic interaction between the magnetic head and the spinning magnetic disk. The lift force is opposed by equal and opposite spring forces applied by the suspension such that a predetermined flying height is maintained over a full radial stroke of the rotary actuator assembly above the surface of the spinning magnetic disk.

Flying head designs have been proposed for use with optical and magneto-optical (MO) storage technology. One motivation for using the magneto-optical technology stems from the availability of higher areal density with magneto-optical storage disks than magnetic storage disks. However, despite the historically higher areal storage density available for magneto-optical disks drives, the conventional magneto-optical disk drive volumetric storage capacity rate of increase has generally not kept pace with the rate of increase of the volumetric storage capacity of magnetic disk drives. One limiting factor in conventional optical reading heads is the low signal to noise ratio exhibited by such heads at high data transfer rates.

Another limiting factor is that optical reading heads require extensive alignment of the optical components and their respective polarizations, rendering the design, manufacturing, and assembly of optical heads significantly more complex and costly.

Other factors that limit writing (or recording) on a magnetic disk at high data transfer rates (or frequencies) using conventional magnetic heads are the increasing requirements for higher magnetic fields and field gradients to achieve smaller and smaller bit size. High magnetic fields are difficult to achieve particularly with narrow tracks and miniaturized heads.

Therefore, there is still a long felt and still unsatisfied need for a read/write head which is structurally significantly less complex than optical reading devices, that requires minimal or no optical alignment, that can write at higher track densities, and that has better control of the data and servo tracks than conventional magnetic heads.

SUMMARY OF THE INVENTION

One aspect of the present invention is to satisfy the foregoing need by providing a magnetic reading element of high track density, combined with a laser heating, thermally assisted write element. The new read/write head is capable of high density recording with a high signal to noise ratio with a design that lends itself to mass production.

The new read/write head uses a laser beam and a waveguide to heat the medium and to lower its coercivity during the write function. The lowered coercivity allows a relatively weak magnetic field to be used to write data, which, upon cooling to ambient temperature, becomes magnetically hard and resistant to self erasure over time.

Another aspect of the present invention is to uniquely integrate an optical waveguide and a magnetic write element (collectively referred to herein as thermally assisted write element), without significantly enlarging the write gap or widening the data track width on the storage medium. An excessively large write gap is undesirable as it does not provide a sharp transition. The narrow data track width is defined and controlled by an overlap region of the waveguide and the magnetic gap, between the write poles. The result is a narrower data track than either the waveguide or the magnetic gap.

The integration of the thermally assisted write element can be accomplished by, for example, mounting a heat source, such as a laser or light source on a slider, and by forming an optical waveguide within a magnetic write gap of the write element. This entire structure is formed using standard wafer fabrication processes. The waveguide directs a laser beam onto a target spot on, or within the data storage medium, and is positionally shifted in the cross track direction (i.e., direction generally normal to the track) from the top write pole.

The recording data track width is determined by an overlap region of the waveguide and the top write pole. This overlap region is defined at one end by the magnetic profile of a magnetic write pole (P2) edge, and at another end by the thermal profile of the waveguide edge. In one embodiment, a giant magneto-resistive (GMR) element is selected as the read element, and has one edge aligned with the magnetic write pole (P2) edge and the other edge aligned with an edge of the waveguide.

The head is capable of recording and reading a longitudinal medium, thereby enabling its use in conventional magnetic disk drives. The head is further capable of recording and reading a vertically medium, thereby enabling its use in magneto-optical drives.

The read/write head increases the areal density of the storage medium as it enhances the servo-writing process by reducing normally wasted dead space between tracks. The magnetic read operation yields a significantly better wide band signal to noise ratio than the optical read, which enhances the head performance especially at high frequencies. Since the waveguide is aligned relative to the poles during wafer processing the head requires minimal optical alignment, making it significantly simpler and less expensive to build than conventional optical read/write heads. It further provides better writing capabilities at high track densities than conventional magnetic recording systems.

BRIEF DESCRIPTION OF THE DRAWINGS

The features of the present invention and the manner of attaining them, will become apparent, and the invention itself will be understood by reference to the following description and the accompanying drawings, wherein.

Similar numerals in the drawings refer to similar elements. It should be understood that the sizes of the different components in the figures might not be in exact proportion, and are shown for visual clarity and for the purpose of explanation.

DETAILED DESCRIPTION OF THE INVENTION

Figure 1:
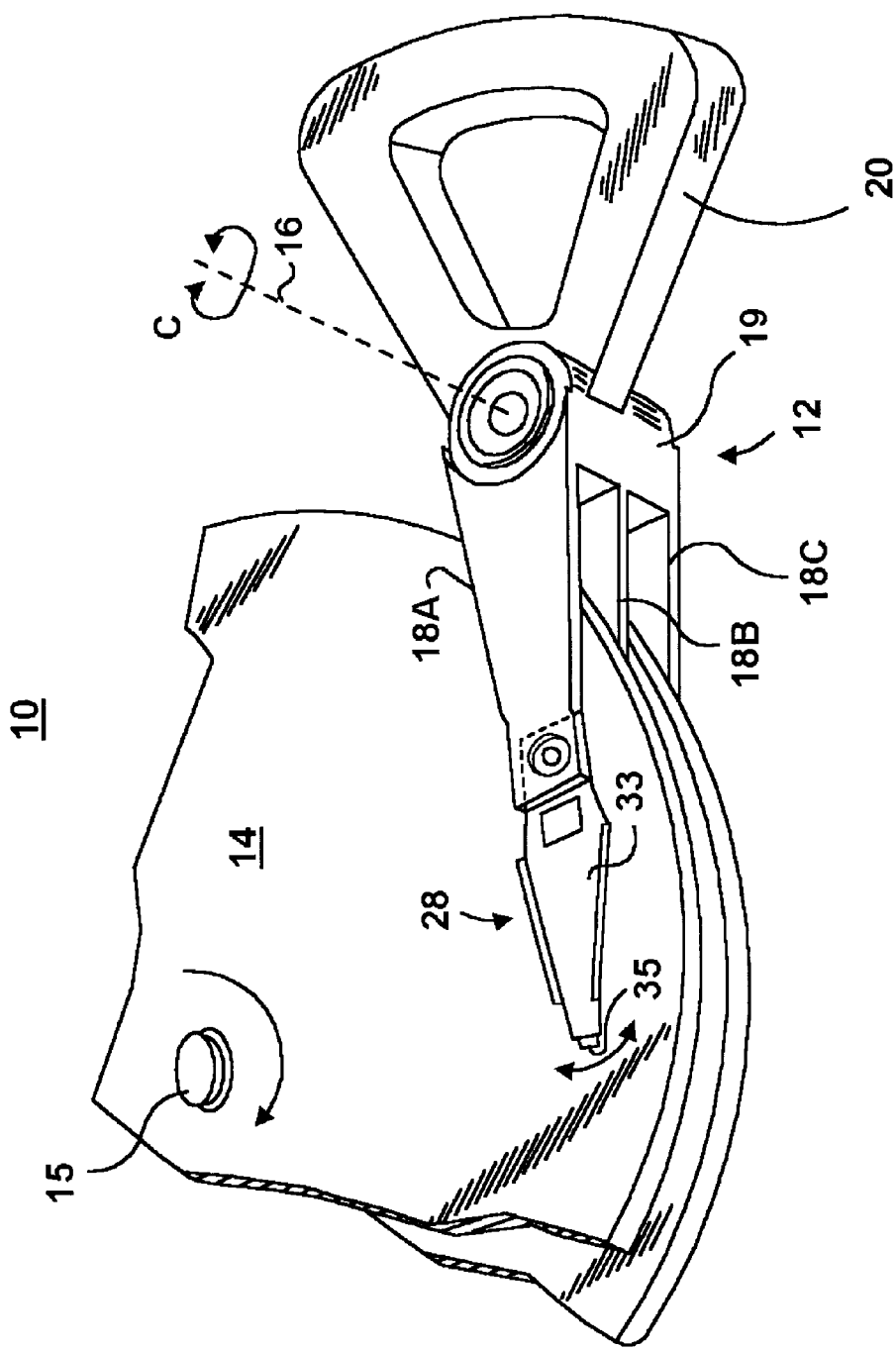
FIG. 1 is a fragmentary perspective view of a data storage system utilizing a read/write head according to the invention.

FIG. 1 illustrates a disk drive 10 comprised of a head stack assembly 12 and a stack of spaced apart data storage disks or media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor 20 attached to the block 19 in a position diametrically opposite to the actuator arms 18A, 18B, 18C. The rotor 20 cooperates with a stator (not shown) for rotating in an arc about the actuator axis 16. Energizing a coil of the rotor 20 with a direct current in one polarity or the reverse polarity causes the head stack assembly 12, including the actuator arms 18A, 18B, 18C, to rotate about the actuator axis 16 in a direction substantially radial to the disks 14.

A head gimbal assembly (HGA) 28 is secured to each of the actuator arms, for instance 18A. As further illustrated in FIG. 2, the HGA 28 is comprised of a suspension 33 and a read/write head 35. The suspension 33 includes a load beam 36 and a flexure 40 to which the head 35 is secured.

The head 35 is comprised of a slider 47 secured to the free end of the load beam 36 by means of the flexure 40; and a read/write element 50 supported by the slider 47. In the example illustrated in FIG. 2, the read/write element 50 is secured to the trailing end 55 of the slider 47. The slider 47 is also referred to herein as a support element since it supports the read/write element 50. The slider 47 can be any conventional or available slider. A laser diode 92 is secured to the slider 47 and is positioned over the read/write element 50 for optical coupling to the waveguide (not illustrated) which passes through the read/write element 50.

The details of the read/write element 50 will now be described with reference to FIGS. 3, 3A, 4, 5 and 6. The read/write element 50 is a hybrid transducer that integrates a thermally assisted magnetic write section 60 and a magnetic read section 61. The magnetic read section 61 is formed of a first shield layer (Shield 1 or S1) 80 preferably made of a material that is both magnetically and electrically conductive. For example, the first shield layer 80 can have a nickel-iron composition, such as Permalloy, or a ferromagnetic composition with high permeability. The thickness of the first shield layer 80 can be in the range of approximately 0.5 micron to approximately 14 microns, and preferably in the range of approximately 1 micron to approximately 4 microns.

The magnetic read section 61 is comprised of a read element 62 formed within a read gap 87. In this example, the read section 61 is a giant magnetoresistive (GMR) element. An insulating layer 86, which may be made of aluminum oxide or silicon nitride, for example, is formed within the read-gap 87, over substantially the entire length of the first shield layer 80. The insulating layer 86 envelops the read element 62, but preferably not the air bearing surface of the read element 62.

The GMR read element 62 can be formed, by way of example, by depositing a plurality of alternating ultra-thin layers of magnetically conductive and nonconductive materials such as Permalloy (Ni80 Fe20) and copper (Cu), each layer being approximately 10 to 30 angstroms thick. The electric resistance of the GMR element 62 fluctuates when exposed to a time-varying magnetic flux.

The read section 61 is also comprised of a second shield layer (Shield 2 or S2) 85, that can be formed over substantially the entire insulating layer 86. Preferably, the second shield layer 85 is made of an electrically and magnetically conductive material that can be similar or equivalent to that of the first shield layer 80. The thickness of the second shield layer 85 can be, optionally but not necessarily, substantially similar or equivalent to that of the first shield layer 80. It should be clear that the read section 61 is not limited to GMR elements, and can be formed of other available magnetic elements.

A read circuit 102 (FIG. 4) is connected to the first shield 80 and the second shield 85, such that during a read mode the read circuit 102 sends a sensing electric current $I_R$ through the GMR element 62. The read-sense current $I_R$ flows perpendicularly through the GMR element 62, thus avoiding the along-the plane electromigration problems and magnetic-biasing due to parallel-current problems associated with earlier designs based on CIP operation (Current In the Plane mode). Reference is made to U.S. Pat. No. 5,576,914 which is incorporated herein by reference.

The write section 60 is comprised of a first pole layer (Pole 1 or P1) 85, a second pole layer (Pole 2 or P2) 96, a write gap 98 formed between the first and second pole layers 85, 96 respectively, an optical waveguide core 88 formed partially within a write gap 98, and an optical waveguide cladding 299.

Figure 4:
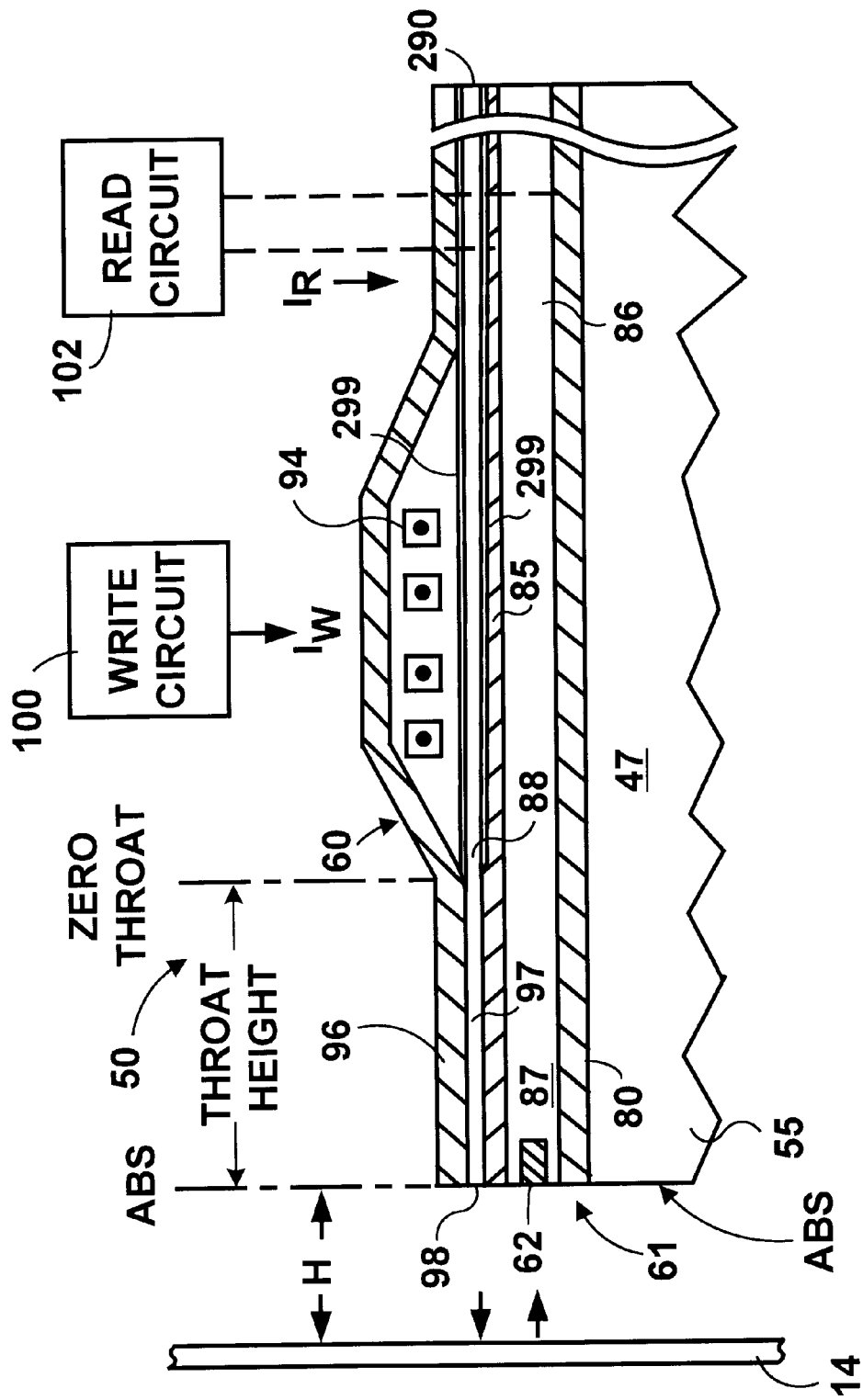
FIG. 4 is a cross-sectional view of the read/write element of FIG. 3 taken along line 4—4, and shown positioned on a slider relative to a data storage medium.

With reference to FIG. 4, write element 60 has a pole tip height dimension referred to as "throat height". The throat height is measured between the air bearing surface ("ABS"), formed by lapping and polishing the pole tip, and a zero throat level where the pole tip of the write head transitions to a back region. A pole tip region is defined as the region between the ABS and the zero throat level. The waveguide cladding 299 boarders two sides of the waveguide core 88 within the pole tip region and completely surrounds the waveguide core 88 above the pole tip region.

In the embodiment illustrated in FIGS. 3–6, the first pole layer (Pole 1) is the same as the second shield layer (Shield 2) 85. It should be clear that in another embodiment the first pole layer (Pole 1) can be distinct from the second shield layer (Shield 2) 85.

The optical waveguide core 88 is formed within the write gap 98 along substantially the entire length of the first pole layer 85, and extends to the backside of the slider, opposite the ABS, for guiding a light beam through the write section 60 (also referred to as write element). The waveguide core 88 is formed of a material such as TiO2 that has a high optical index of refraction. The waveguide cladding 299 is formed of a material, such as TiO2, with a low index of refraction. The light beam can be a laser beam that provides the required energy to heat a target spot on a data layer within the disk 14, to a critical temperature. This lowers the coercivity (Hc) of the data layer temporarily in order to erase and write data. In one embodiment, the critical temperature is close to the Curie temperature of the data layer. As the critical temperature is approached or reached, the field strength in the data layer magnetic domain is greatly reduced. An external magnetic field generated by the thermally assisted write section 60 is then used to reverse the field in the target domains, as desired, to record a "1" or a "0" data bit. Data is recorded by orienting the magnetization of a spot or domain, directionally, for example in either an up or a down direction. The read element 61 reads the recorded data by measuring the change in the resistance of the GMR element 62.

Figure 3:
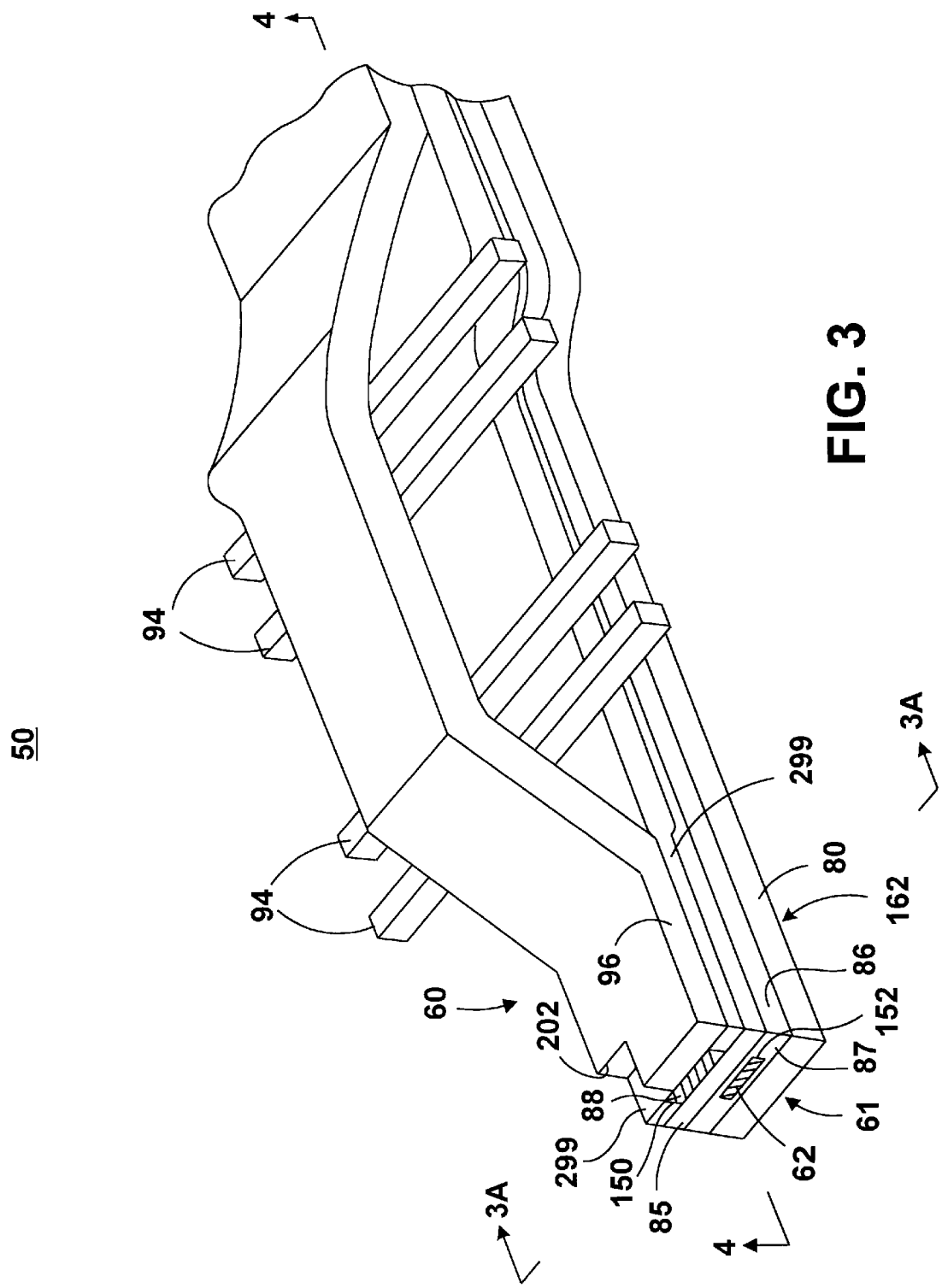
FIG. 3 is an enlarged perspective view of a read/write element forming part of the read/write head of FIGS. 1 and 2, and integrating a thermally assisted write section and a magnetic (GMR) read section according to the present invention.
Figure 3A:
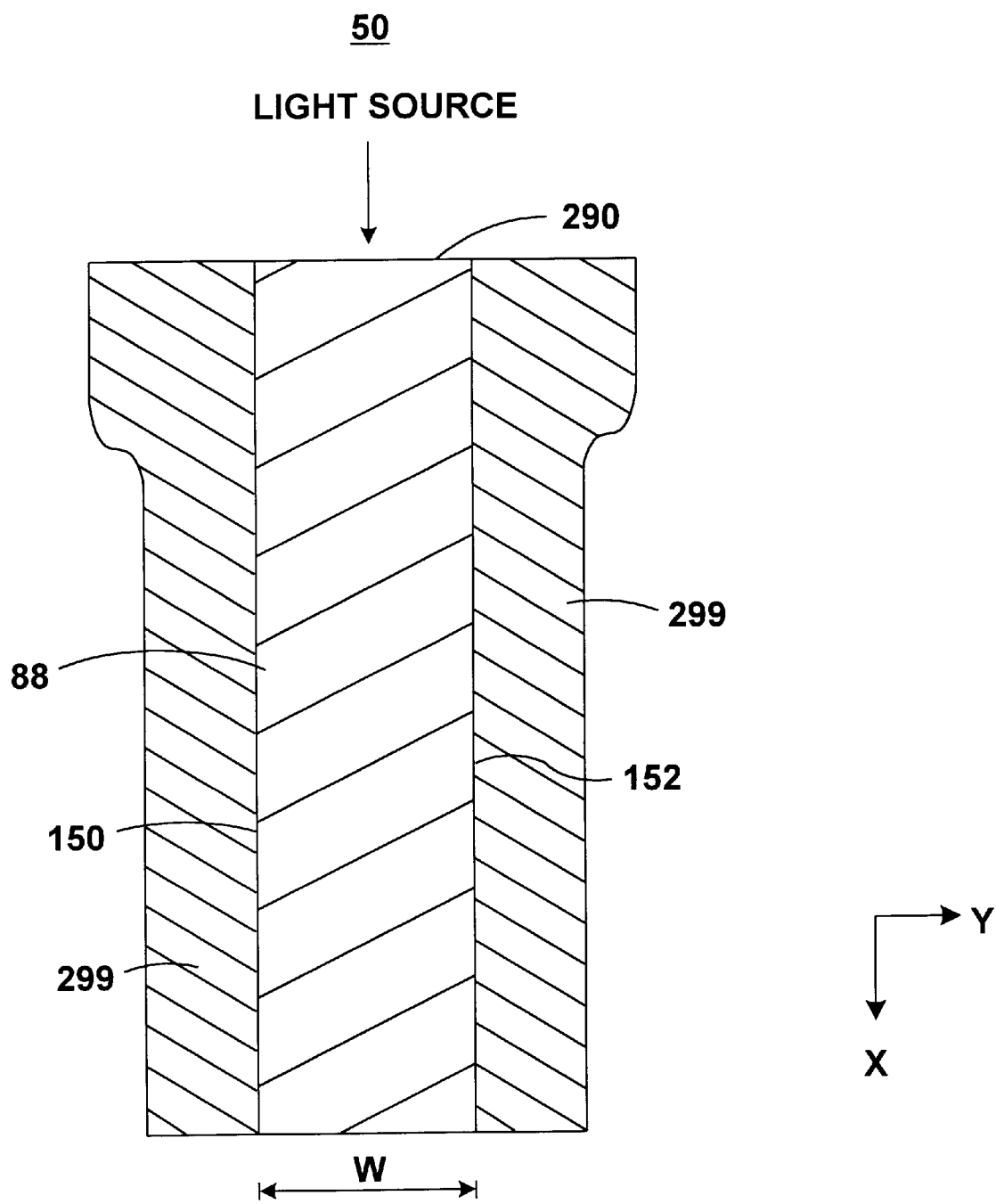
FIG. 3A is an enlarged cross-sectional view of the read-rite element of FIG. 3, taken along line 3A—3A and illustrating an optical waveguide according to the present invention.
Figure 5:
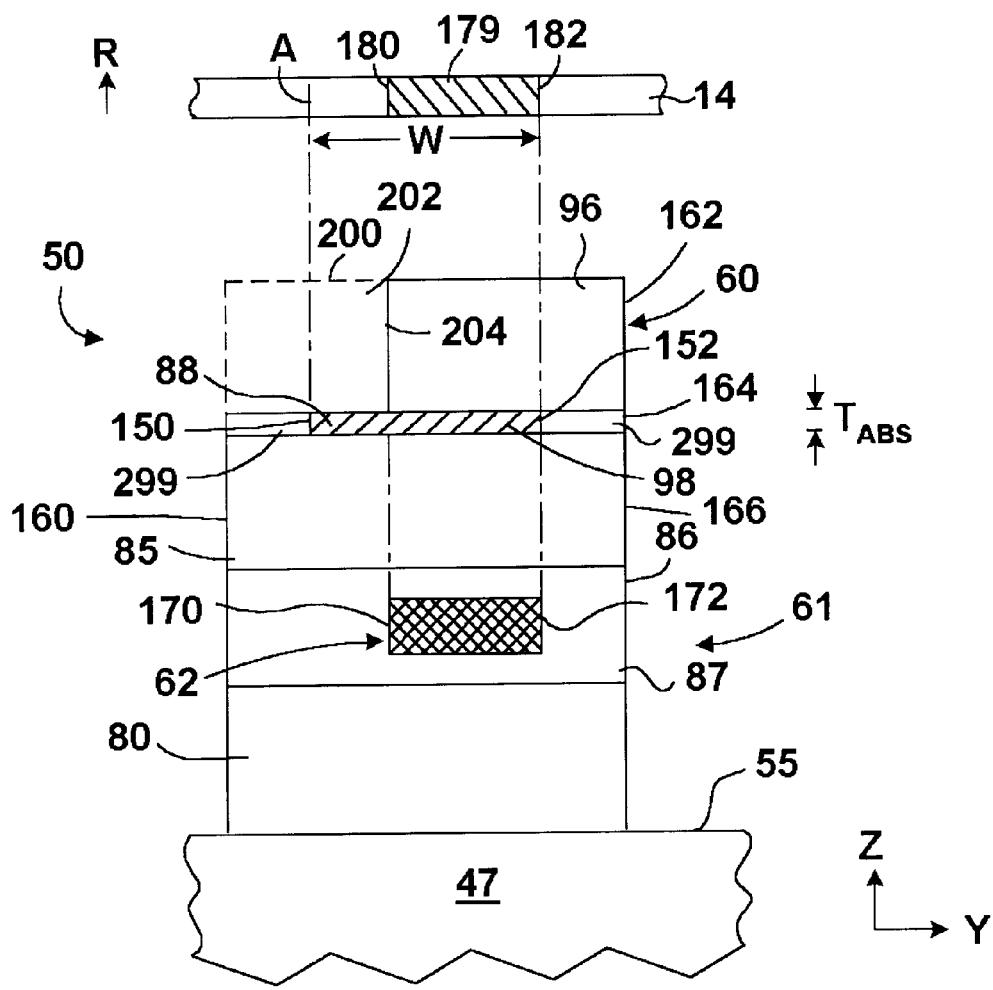
FIG. 5 is an enlarged, partial, front elevation view of the read/write element of FIG. 4 with selective hatching for added visual clarity, illustrating a data storage medium in a rotated position (i.e., not the actual physical position) for facilitating the comparative description between the read/write element and the data track width written and read by the read/write element on the data storage medium.
Figure 6:
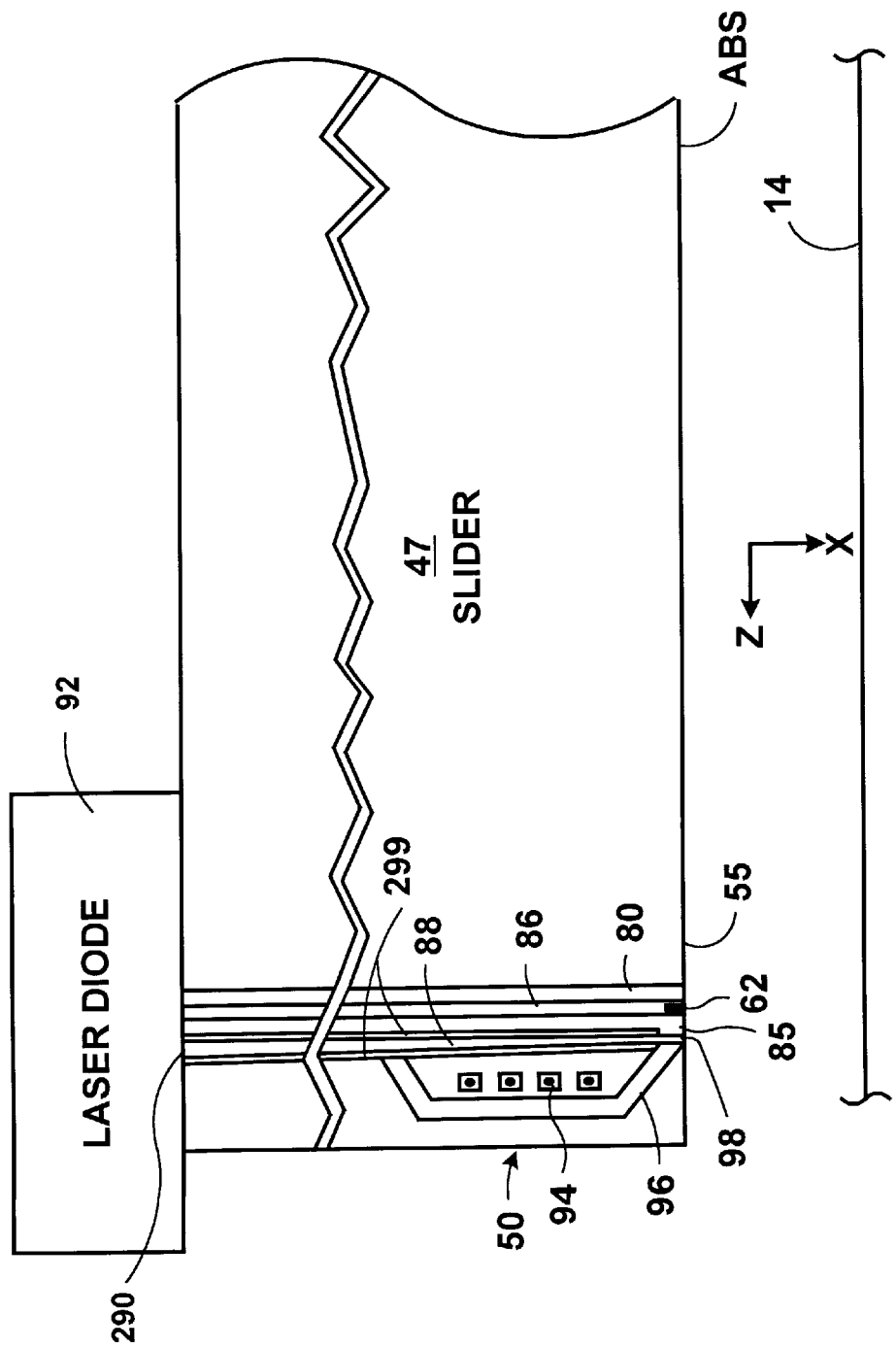
FIG. 6 is a partial cross-sectional view of the read/write element of FIG. 3 taken along line 4—4, shown positioned on the slider relative to the data storage medium, and further illustrating an optical assembly, such as a laser diode chip mounted on the slider.

As illustrated in FIG. 3A, an exemplary optical waveguide core 88 has parallel sides 150,152, and its width is substantially constant along the X-direction. With further reference to FIG. 5, the optical waveguide core 88 has a rectangular cross-sectional surface area. Referring to FIG. 6 it can be seen that in this plane, that is perpendicular to the plane shown in FIG. 3A, the thickness of the optical waveguide core 88 has a tapering cross-section. An input end 290 of the waveguide core 88 is larger next to the laser diode 92 to facilitate light coupling, and decreases to fit within the write gap 98, between the top and bottom poles 96, 98. This tapered waveguide core 88 allows the relatively large laser beam emitting from the laser diode 92 to be conveniently aligned and funneled to a smaller and more highly concentrated beam at the ABS exit end, providing a sharp-edged heat spot on the disk. It should be clear that other cross-sectional configurations can be employed (e.g. circular, square, elongated, etc.).

With reference to FIGS. 3, 3A, and 5, the optical waveguide core 88 is defined by two side edges 150, 152. In a preferred embodiment, the two side edges 150, 152 are flat and parallel. At, or close to the air bearing surface, the optical waveguide core 88 has substantially the same thickness "$T_{ABS}$" (FIG. 5) as the waveguide cladding 299, such that the write gap 98 has a uniform thickness. The thickness "$T_{ABS}$" can range between approximately 1 micron and approximately 0.2 micron.

With reference to FIG. 5, the width of the track 179 is defined by the space between two track sides 180, 182, and is determined by the overlap region between the side 204 of the second pole layer 96 and the side edge 152 of the waveguide core 88. The width of the track 179 is narrower than either the optical waveguide core 88 width or magnetic gap width as determined by the second pole layer 96 width. Further, the width of the track 179 is comparable to the width of the read element 62 defined between two side edges 170, 172.

Preferably, the side edge 152 of the optical waveguide 88 coincides and is co-planar with the side edge 172 of the reading element 62 and track side 182. It is also preferred that the side 204 of the second pole layer 96 coincides and be co-planar with the side edge 170 of the reading element 62 and track side 180. This allows higher track density and higher signal/noise ratio of the read signal.

With reference to FIGS. 3 and 5, the second pole layer 96 can be made of an electrically and magnetically conductive material that is similar or equivalent to that of the first shield layer 80 and the first pole layer 85. The thickness of the second pole layer 96 can be substantially the same (or optionally different from) that of the first shield layer 80. The second pole layer 96 overlays part of the optical waveguide core 88 and optical waveguide cladding 299 along the throat height region. The second pole layer 96 includes a cutout region 200 which is defined by two sides 202 and 204 that are angularly disposed relative to each other. In this embodiment, sides 202 and 204 are normal to each other. It should however be understood that another angular relationship can be entertained.

Side 202 extends from side 160 of the read/write element 50, parallel to the air bearing surface. Side 204 is normal to the air bearing surface and extends from side 202 to the air bearing surface. In the present example, side 204 coincides with the side edge 170 of the reading element 62, and track side 180.

In operation, the laser beam propagating through the optical waveguide core 88 heats a section of the track 179 having a width W, underneath the optical waveguide 88, shown extending between track side 182 and a broken line A, thus significantly reducing the disk coercivity. The magnetic field from the head at the medium adjacent the gap 98 is sufficiently large to reorient the domains of the data bits therewithin, in the section of the track 179 having reduced coercivity from laser heating, thus enabling the write element 60 to write data within track 179.

The region of the track 179 under the gap 98 between side edge 152 of the optical waveguide core 88 and side 162 of write element 60 cannot be overwritten because the coercivity has not been reduced, since there is no laser heating in this region. Since the magnetic field corresponding to the cutout region 200 is not sufficiently large to reorient the domains of the data bits on the disk 14 in the region between track side 180 and line A, even though this track region is heated by the waveguide 88, the write element 60 does not write data within this region. As a result, the effective writing portion of the write element 60 is defined by the overlap region between the second pole layer 96 (excluding the cutout region) and the optical waveguide core 88. In essence, side 204 provides the necessary magnetic field gradient to define the track side 180, and side edge 152 provides the necessary thermal boundary of the heated section with reduced coercivity to delineate the track side 182.

The placement of the optical waveguide core 88 within the write gap 98 combined with the extension of the optical waveguide core 88 beyond the overlap region presents an important aspect of the invention. This design allows the magnetic and thermal gradients to interact concurrently, to write data on the track 179. In other terms, as the disk travels in the direction R (see FIG. 5) relative to the read/write element 50, the heat generated on the data track 179 as the laser beam is transmitted through the optical waveguide core 88, is sufficient to adequately reduce the coercivity for writing and does not dissipate before the magnetic field is applied.

The extension of the optical waveguide core 88 beyond the overlap region is a critical feature of the invention because it is difficult to make extremely narrow optical waveguides. This extension of the optical waveguide core 88 is made functionally possible since side 204 of the second pole layer 96 defines the track side 180. Consequently, the edge 150 of the optical waveguide core 88 can extend comfortably beyond edge 204 of the second pole layer 96 allowing increased alignment tolerances.

Additional manufacturing benefits accrue from this extended waveguide design. The waveguide cladding 299 extends further beyond the waveguide core 88 with comfortable tolerances. Further, the side 160 of the first pole layer 85 extends far enough, with greater tolerances, for the first pole layer 85 to become a platform for the optical waveguide core 88 and the waveguide cladding 299.

It can also be seen that alignment is not critical between the sides 162,164,166 of the write element 60. Similarly, the widths of the first pole layer 85, the second pole layer 96, the optical waveguide core 88, and the waveguide cladding 299 do not play a critical role. The read/write element 50 design is reduced to following two critical alignments: the alignment of edge 204 of the second pole layer 96 to side edge 170 of the reading element 62, and the alignment of side edge 152 of the optical waveguide core 88 to side edge 172 of the reading element 62.

The thickness $T_{ABS}$ of the waveguide core 88 should be minimized so that the written data bit has a narrow bit length while maintaining a narrow track width. According to one example, the thickness $T_{ABS}$ can be less than approximately 0.1 micron, and the overlap region of the optical waveguide core 88 (which is substantially equal to the written track width 179) can be equal to or less than approximately 0.3 micron.

The read/write element 50 offers the added advantage of ease of fabrication due to minimal patterning steps of the optical waveguide core 88, the waveguide cladding 299 and the pole layers 80, 85, 96.

The optical waveguide core 88 and waveguide cladding 299 can be formed by means of available thin-film technology. One exemplary manufacturing process includes patterning the second shield layer 85 and the adjacent waveguide cladding 299 with photoresist material, and then etching a cavity using available techniques such as ion milling.

The optical waveguide core 88 and the waveguide cladding 299 are both made of optical material each having an appropriate index of refraction to enable the waveguide core 88 to conduct the light beam. It should be clear that the optical waveguide core 88 and waveguide cladding 299 can be made with materials having low transmissive losses and various refractive indices.

Another manufacturing process includes starting with a film of optical material and through available thin film techniques, etching it away to form the optical waveguide core 88, and then patterning and forming the adjacent waveguide cladding 299 and the second pole layer 96, in essence reversing the manufacturing process described above.

A write circuit 100 (FIG. 4) is connected to the write coil 94, and, during a write mode, it sends an electrical current $I_W$ to induce a flux flow through the write gap 98. Changes in the flux flow across the write gap 98 produce the different magnetic orientations of domains forming magnetized regions or bits in the disk 14 during a write operation, when the disk 14 is heated by the laser beam.

With reference to FIGS. 2, 3A, 4, 5, 6, the read/write element 50 can be mounted in any position at the trailing end 55 of the slider 47 so that its forwardmost tip is generally flush with the air bearing surface (ABS) of the slider 47. Preferably, however, the read/write element 50 is mounted along a central axis. In another embodiment according to the present invention more than one read/write element 50 (shown in dashed lines in FIG. 2) can be secured to the trailing end 55 or to other side(s) of the slider 47.

Figure 2:
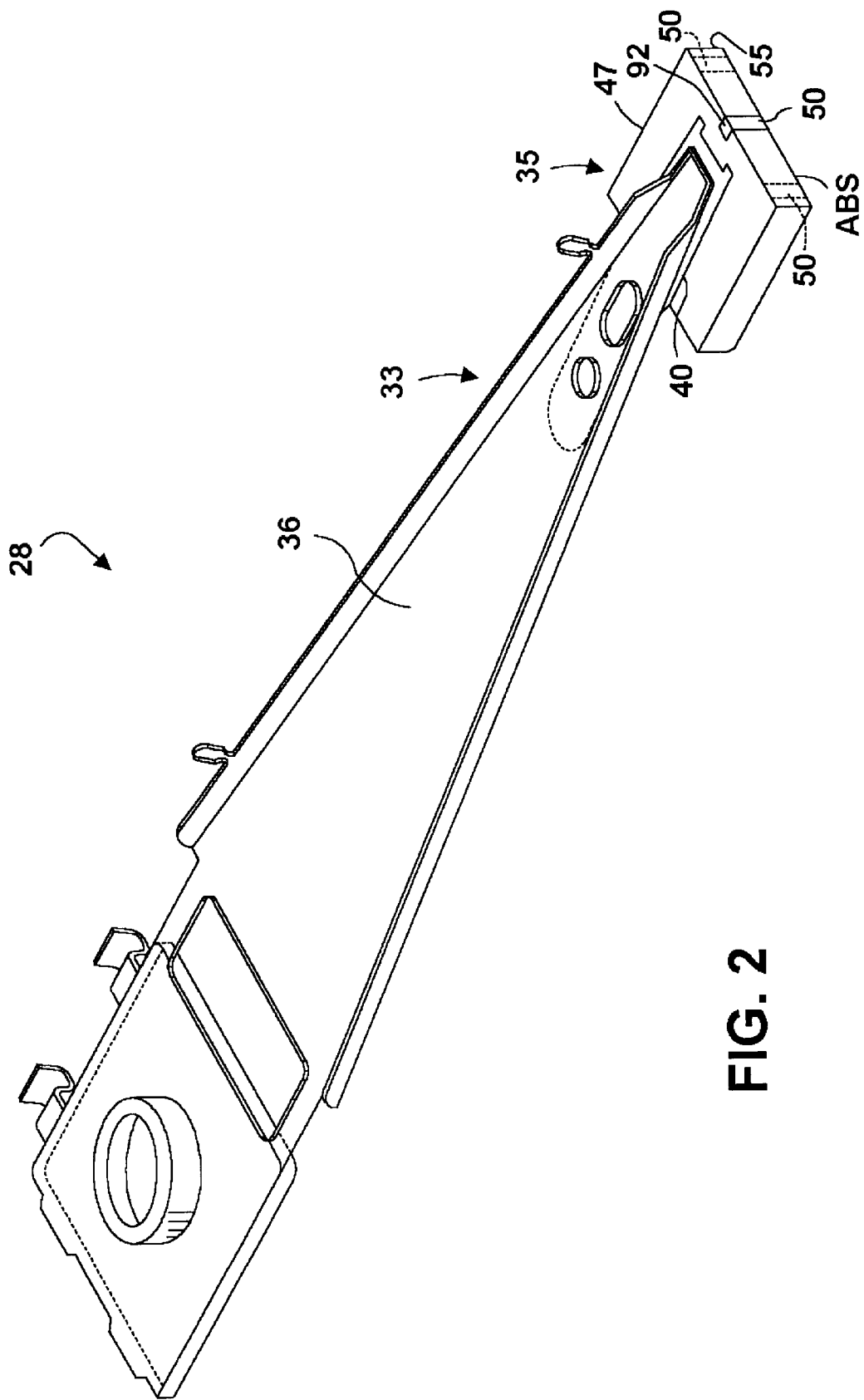
FIG. 2 is a perspective view of a head gimbal assembly comprised of a suspension, and a slider to which the read/write head of FIG. 1 is secured, for use in a head stack assembly.

The optical waveguide core 88 is coupled to a heat source, such as a laser diode 92 (FIG. 6) to transmit heat to the data track 179 on the disk 14. The laser diode 92 can be mounted at any convenient location to facilitate optical coupling to the input end of the optical waveguide core 88. For example, the laser diode 92 chip can be mounted on the backside of the slider 47 (FIGS. 2 and 6). An exemplary laser diode chip is referenced in "The Physical Principles of Magneto-optical Recording", by Masud Mansuripur, pages 17–20 (1995).

It should be clear that the placement of the read/write element 50 is not limited to a single location, and that various suitable locations can be selected. Additionally, while the light source 92 is disclosed herein as providing the necessary energy for heating the target spots on disk 14, it should be clear that alternative heat or energy sources can be used to achieve this purpose. One such heat source can be a heated wire, probe, tip or point source of heat located in close proximity to the disk surface. Additional mechanical and/or optical components can be added to aid in the transmission of the heat/light to the target spot on or within the disk 14.

FIGS. 3, 4, and 6 clarify another feature of the present design, namely the tapering of the optical waveguide core 88 in the Z height direction, beginning with a relatively large thickness and width at the input end 290 in order to achieve proper laser light coupling, and ending in a relatively small thickness $T_{ABS}$, and width at the ABS end. The waveguide cladding 299 is used to minimize the light losses from the waveguide core 88. As stated earlier, the waveguide cladding 299 completely envelops the optical waveguide core 88 from the input end 290 to the pole tip region. The waveguide cladding 299 is only on the sides of the optical waveguide core 88 in the pole tip region. The waveguide cladding 299 is removed in the pole tip region so as to reduce the thickness $T_{ABS}$ of the waveguide 88. In the pole tip region the first and second pole layers 85, 96 functionally replace the waveguide cladding 299 by helping to confine the laser beam within the gap 98.

Figure 7:
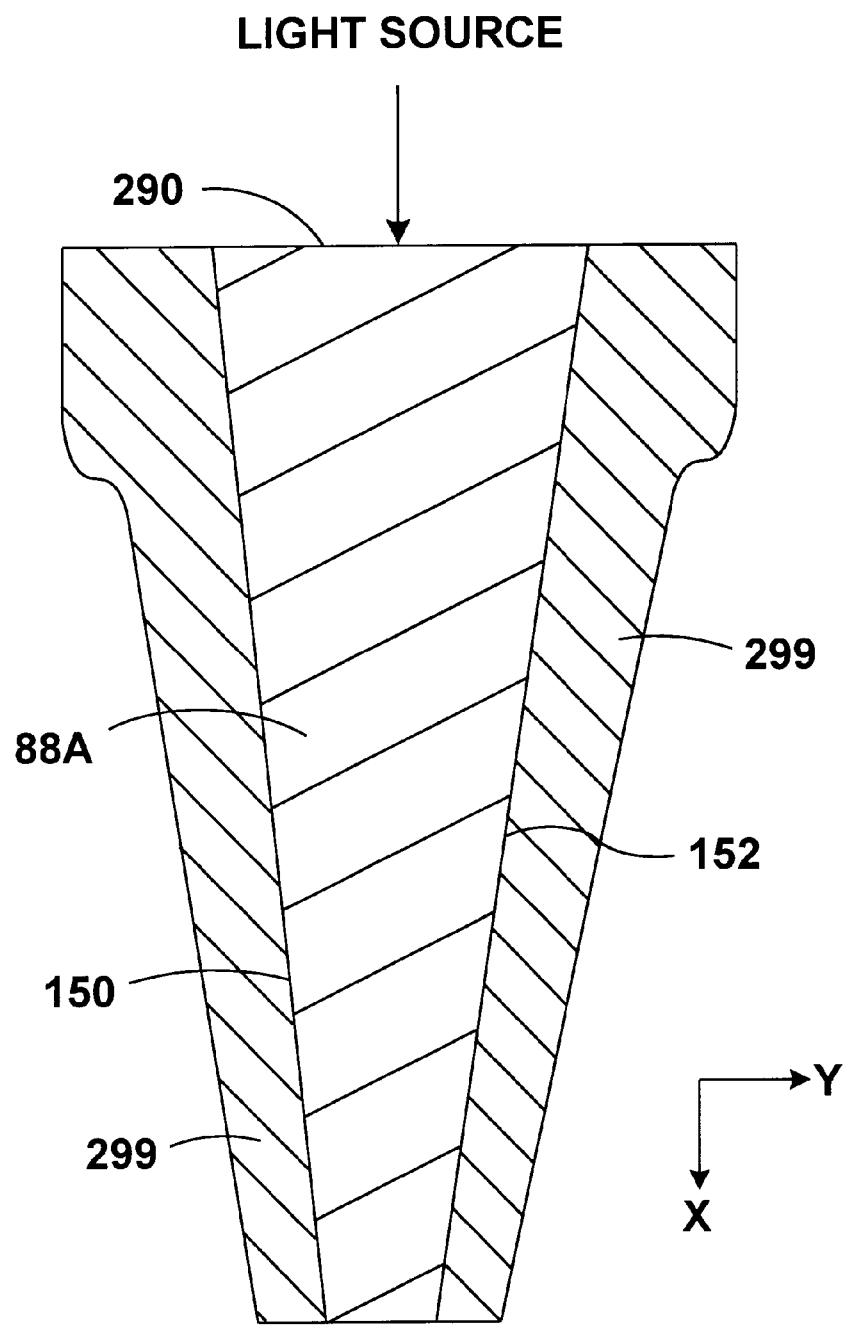
FIG. 7 is an enlarged cross-sectional view of another embodiment of the read-rite element of FIG. 3, taken along line 3A—3A and illustrating an optical waveguide according to the present invention.

FIG. 7 illustrates another optical waveguide core 88A having a similar function to, but a different shape than the optical waveguide core 88 of FIG. 3A. The optical waveguide core 88A has a tapered or funnel shape in the Y-direction. The funnel shape of the optical waveguide core 88A allows further improved coupling between the optical waveguide core 88A and the laser source 92. The waveguide cladding 299 has a corresponding taper with the optical waveguide core 88A.

It should be understood that the geometry, compositions, and dimensions of the elements described herein can be modified within the scope of the invention. In addition, while the invention has been described in connection with disk drives, it should be clear that the invention can be alternatively used in various other applications.

What is claimed is:

1. A read/write element that enables transduction of data on a data storage medium, comprising:

a thermally assisted inductive write section that writes data on the data storage medium; and a magnetic read section that reads data from the data storage medium;

said write section including an optical waveguide core formed between a first write pole and a second write pole to conduct a light beam for heating a target on the data storage medium;

said second write pole and said optical waveguide core being offset relative to each other within a pole tip region and defining an overlap region;

said overlap region defining a written track width;

wherein said read section includes a magneto-resistive element;

wherein one edge of said second write pole is substantially aligned with a first edge of said magneto-resistive element of said read section; and wherein one edge of said optical waveguide core is substantially aligned with a second edge of said magneto-resistive element such that said overlap area of said second write pole layer and said optical waveguide core is substantially aligned with said magneto-resistive element of said read section.

2. A read/write element according to claim 1, wherein said second write pole includes a cutout region for allowing a first edge of said optical waveguide core to extend beyond a first edge of said second write pole.

3. A read/write element according to claim 2, wherein a second edge of said second write pole extends beyond a second edge of said optical waveguide core.

4. A read/write element according to claim 1, further including an optical cladding that borders said waveguide core on only two sides in said pole tip region; and wherein said optical cladding otherwise envelops said waveguide core outside said pole tip region.

5. A read/write element according to claim 1, wherein said first write pole is wider than said second write pole to provide a platform for said optical waveguide core and waveguide cladding.

6. A read/write element according to claim 1, wherein said first write pole is offset relative to said second write pole at said pole tip region.

7. A read/write element according to claim 2, wherein said read section includes a first shield layer made of a magnetically conductive material.

8. A read/write element according to claim 1, wherein said read section further includes an insulating layer formed over said first shield layer to define a non-magnetic, transducing read gap.

9. A read/write element according to claim 8, wherein said read section further includes a second shield layer made of a magnetically conductive material.

10. A read/write element according to claim 1, wherein said write section includes a write coil.

11. A read/write element according to claim 1, wherein said optical waveguide core is generally uniform along substantially its entire length.

12. A read/write element according to claim 1, wherein said optical waveguide core is tapered and includes a larger input end.

13. A read/write element according to claim 11, wherein said optical waveguide core cross-section is rectangular.

14. A read/write element according to claim 1, wherein said optical waveguide core is comprised of an optical material with an index of refraction sufficient to conduct an optical beam.

15. A read/write element according to claim 1, wherein said waveguide cladding is made of a material that minimizes light losses.

16. A read/write method according to claim 1, wherein a laser diode is coupled to said optical waveguide core to provide heat therethrough.

17. A read/write method according to claim 1, wherein said write section and said read section are integrated.

18. A read/write method for transducing data to a data storage medium, comprising:

using a thermally assisted inductive write section to write data onto the data storage medium, said write section including an optical waveguide core formed between a first write pole and a second write pole to conduct a light beam for heating a target on the data storage medium, wherein said second write pole and said optical waveguide core are offset relative to each other within a pole tip region and define an overlap region, and wherein said overlap region substantially defines a written track width;

using a magnetic read section to read data from the data storage medium;

wherein using said thermally assisted inductive write section includes using a write section wherein one edge of said second write pole layer is substantially aligned with a first edge of said magneto-resistive element of said read section, and wherein one edge of said optical waveguide core is substantially aligned with a second edge of said magneto-resistive element such that said overlap area of said second write pole layer and said optical waveguide core is substantially aligned with said magneto-resistive element of said read section.

19. A method according to claim 18, wherein using said thermally assisted inductive write section includes using a write section whose second write pole layer includes a cutout region for allowing a first edge of said optical waveguide core to extend beyond a first edge of said second write pole layer.

20. A method according to claim 18, wherein using said thermally assisted inductive write section includes using a write section whose first write pole layer is wider than said second write pole layer to provide a platform for said optical waveguide core and waveguide cladding.

21. A method according to claim 18, wherein using said thermally assisted inductive write section includes using a write section whose first write pole layer is offset relative to said second write pole layer at said pole tip region.

22. A method according to claim 18, wherein using said thermally assisted inductive write section includes using a write section that includes a write coil.

23. A method according to claim 18, wherein using said thermally assisted inductive write section includes using a write section wherein said optical waveguide core is tapered and includes a larger input end.

24. A method according to claim 18, wherein using said thermally assisted inductive write section includes using a write section whose optical waveguide core is comprised of an optical material with an index of refraction sufficient to conduct an optical beam.

25. A method of making a read/write element that enables transduction of data on a data storage medium, comprising:

forming a thermally assisted inductive write section capable of writing data on the data storage medium;

forming a magnetic read section capable of reading data from said data storage medium;

providing said write section with an optical waveguide core formed between a first write pole and a second write pole to conduct a light beam for heating a target on the data storage medium;

offsetting said second write pole and said optical waveguide core relative to each other within a pole tip region, for defining an overlap region that substantially determines a written track width; and wherein offsetting said second write pole and said optical waveguide core relative to each other includes substantially aligning one edge of said second write pole layer with a first edge of said magneto-resistive element of said read section, and substantially aligning one edge of said optical waveguide core with a second edge of said magneto-resistive element such that said overlap area of said second write pole layer and said optical waveguide core is substantially aligned with said magneto-resistive element of said read section.

26. A method according to claim 25, wherein forming said thermally assisted inductive write section includes providing said second write pole layer with a cutout region for allowing a first edge of said optical waveguide core to extend beyond a first edge of said second write pole layer.

27. A method according to claim 25, wherein forming said thermally assisted inductive write section includes providing said write section with a first write pole layer that is offset relative to said second write pole layer at said pole tip region.

* * * * *